United States Patent

Kurei

[15] 3,643,572
[45] Feb. 22, 1972

[54] CAMERA STRUCTURE FOR PREVENTING IMPROPER AUTOMATIC EXPOSURES

[72] Inventor: Hiroshi Kurei, Tokyo-to, Japan
[73] Assignee: Asahi Kogaku Kogyo Kabushiki Kaisha, Tokyo-to, Japan
[22] Filed: Oct. 30, 1970
[21] Appl. No.: 85,641

[30] Foreign Application Priority Data

Dec. 6, 1969 Japan..............................44/115580

[52] U.S. Cl. ................................................95/42, 95/10 C
[51] Int. Cl. ..........................................G01j 1/00, G01j 1/52
[58] Field of Search..............................................95/10 C, 42

[56] References Cited

UNITED STATES PATENTS

| | | | |
|---|---|---|---|
| 3,221,626 | 12/1965 | Fuketa | 95/42 |
| 3,442,192 | 5/1969 | Sato | 95/42 |
| 3,474,715 | 10/1969 | Nakamura | 95/42 |

Primary Examiner—Joseph F. Peters, Jr.
Assistant Examiner—Richard A. Wintercorn
Attorney—Steinberg & Blake

[57] ABSTRACT

A single-lens reflex camera of the type which provides automatic exposure determination with light received through the objective. A mirror or reflector has a viewing position in the path of light received through the objective and permitting proper automatic exposure determination. This reflector also has an exposure position situated beyond the latter path of light and preventing proper automatic exposure determination. For special photography purposes, a manually operable positioning structure coacts with the reflector to maintain it in its exposure position. A manually operable selecting structure is provided for selecting either automatic exposure determination or one of a plurality of exposure-determining factors. A shutter release is available to be manually actuated for tripping the shutter. A blocking structure coacts with the shutter release as well as with the positioning structure and selecting structure to block the shutter release automatically in response to location of the positioning structure in its position maintaining the reflector in its exposure position and to location of the selecting structure in the position providing for automatic exposure determination.

10 Claims, 2 Drawing Figures

PATENTED FEB 22 1972

3,643,572

INVENTOR
HIROSHI KUREI
BY
Steinberg & Blake
ATTORNEYS

CAMERA STRUCTURE FOR PREVENTING IMPROPER AUTOMATIC EXPOSURES

BACKGROUND OF THE INVENTION

The present invention relates to cameras.

In particular, the present invention relates to single-lens reflex cameras of the type which provide for automatic exposure determination with light received through the objective of the camera.

Single-lens reflex cameras of this general type have a wide range of utility. They are of course suitable for normal photography. However, they are especially suitable also for special photography where microscopic photographs are made, for example, or where reproduction of a photograph is carried out. Special photography of this latter type is carried out under highly controlled conditions where automatic exposure determination is not required. These special photography operations are carried out under conditions where the distance from the camera to the object is known, where the lighting conditions are known, and where all variables are precisely known so that perfect exposures can be made without the necessity for bringing the automatic exposure structure into play. When operating the camera for special photography purposes of this type, there is the disadvantage of introducing unavoidable shake and vibration into the camera when the mirror or reflector thereof is snapped into the exposure position where it no longer extends across the path of light entering through the objective. Thus, conventional single lens reflex cameras have a tiltable reflector which in its viewing position extends across the path of light entering through the objective, so as to direct the light to the viewfinder. One of the primary advantages of the single lens reflex camera is that in this way the viewfinder provides an image of what exactly is seen through the objective itself. However, under the precise conditions required for special photography purposes of the above type, the vibration or momentary shaking of the camera due to snapping of the reflector to its exposure position out of the path of light passing through the objective may introduce undesirable movement which will prevent the best possible photograph from being achieved. Therefore, in order to adapt to a single-lens reflex camera for such special photography purposes, it is known to provide the camera with a positioning structure which maintains the mirror in its exposure position beyond the path of light passing through the objective, after operations in preparation for making the special photograph have been carried out. Such operations involve determination of the proper photographing angle, adjustment of the focus, and the like. After these preliminary operations have been carried out, the reflector can be manually positioned so as to remain in its exposure position beyond the path of light received through the objective. With the reflector thus maintained in this latter exposure position, it is possible to trip the shutter and make the exposure, without introducing undesirable shake into the camera at the instant of exposure.

With a camera of the above type, it is also known to automatically determine the exposure with light which has been received through the objective. This latter light used for automatic exposure determination can reach the light-measuring structure of the camera only when the reflector is in its viewing position in the path of light passing through the objective. When the reflector has been displaced to its exposure position, the travel of light to the light-measuring structure is interrupted.

It is therefore possible with a camera of the above type for the camera to be set for automatic exposure determination while the camera is used for special photography purposes of the above type, so that if the shutter is then tripped an improper exposure will necessarily result because the automatic exposure determination cannot be properly carried out while the reflector is maintained in its exposure position to prevent shaking of the camera in connection with the special photography operations. In other words, the operator must remember not to set the camera for automatic exposure determination when carrying out special photography where the reflector is maintained in its exposure position. However, it is easily possible for the operator to forget to place the camera in a position where it will not make an exposure with automatic exposure determination, so that under these conditions improper exposures necessarily result.

SUMMARY OF THE INVENTION

It is accordingly a primary object of the present invention to provide a camera of the above type with a structure which will prevent tripping of the shutter to make an exposure under conditions where the camera is set for automatic exposure determination and the reflector is maintained in its exposure position to prevent undesirable shaking of the camera when the exposure is made for special photography purposes.

It is especially an object of the present invention to provide a structure which can accomplish the above result in a fully automatic manner, requiring no particular attention on the part of the operator.

Thus, it is an object of the present invention to provide a construction which will automatically correct any forgetfulness or neglect on the part of the operator, reliably preventing camera operation where an improper automatic exposure will be made under the above conditions.

It is in particular an object of the present invention to provide an exceedingly simple assembly of components which will operate very reliably to achieve the desired results.

Also, it is an object of the present invention to provide a structure of this type which can be readily incorporated into a single-lens reflex camera without requiring any major redesigning or replacing of components thereof.

According to the invention the single-lens reflex camera, which is of the type capable of making automatic exposures with light received through the objective, has a reflector means movable between a viewing position situated in the path of light passing through the objective and permitting proper automatic exposure and an exposure position situated beyond the latter path and preventing proper automatic exposure. A manually operable positioning means coacts with the reflector means to place the latter in its exposure position. A manually operable selecting means is provided for selecting either automatic exposure determination or one of a plurality of exposure-determining factors. A manually operable shutter-release means is also provided for releasing the shutter to make an exposure. A blocking means coacts with the shutter release means as well as with the positioning means and the selecting means for responding automatically to positioning of the reflector means in its exposure position and to selection of automatic exposure determination by the selecting means to block operation of the shutter release means, so that an exposure cannot be made when the reflector means is maintained in its exposure position and a selection of automatic exposure determination has been made.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
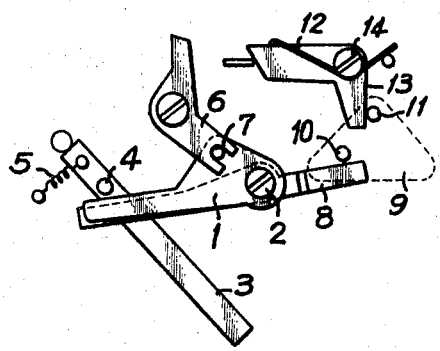
FIG. 1 is a schematic side elevation of a structure of the present invention.

Referring now to FIG. 1 of the drawings, there is illustrated therein a reflector-operating lever 1 which forms part of a quick-return mirror mechanism of a type well known in the art. When the shutter is cocked to make an exposure, a driving force is stored in a known spring and lever mechanism which functions just prior to actual exposure to drive the lever 1 in a clockwise direction as viewed in FIG. 1, about the pivot 2.

This lever 1 engages a pin 4 projecting laterally from a frame which carries the tiltable reflector and which forms part of the reflector means 3 shown in FIG. 1. This reflector means 3 is supported at its top end, as viewed in FIG. 1, for swinging movement between the inclined viewing position shown in FIG. 1 and a substantially horizontal exposure position. Thus, the objective will normally be situated to the right of the reflector 3 of FIG. 1, directing the rays which pass through the objective to the reflector 3 so as to be directed by the latter to the viewfinder for providing the operator with an image of the object which is to be photographed. Just prior to exposure, the reflector is automatically swung upwardly to its exposure position beyond the path of light travelling through the objective, so that this light can now reach the film through the open shutter. A spring 5 urges the reflector means 3 to its viewing position shown in FIG. 1, and the driving force applied to the lever 1 just prior to exposure swings the lever 1 in a clockwise direction, causing the lever 1 to act on the pin 4 in order to swing the reflector means 3 in a counterclockwise direction in opposition to the spring 5 up to its viewing position situated beyond the path of light travelling through the objective.

Where the camera is provided with automatic exposure determination utilizing light which is received through the objective, this light can reach the light-measuring structure in the camera only when the reflector means 3 is in the viewing position shown in FIG. 1. When this reflector means 3 has been moved up to its exposure position, the travel of light to the light-measuring structure is interrupted.

The lever 1 is provided with a pin 7 received in a notch of a lever 6. In single-lens reflex cameras, it is conventional to provide focal plane shutters, including leading and trailing shutter curtains. The swinging of the lever 1 in a clockwise direction to displace the reflector means 3 to its exposure position results through the pin 7 in swinging of the lever 6 to release the leading curtain for movement to a position opening the shutter so that the exposure will be made, and after the predetermined exposure time has elapsed the trailing curtain will automatically respond to close the shutter and terminate the exposure. These operations and components are well known in the art.

As has been pointed out above, for special photography purposes it is undesirable to permit the lever 1 to snap the reflector 3 up to its exposure position, since this will introduce an undesirable shake or vibration into the camera, preventing the best possible photograph from being made. Therefore, a manually operable positioning means is provided for manually positioning the reflector means 3 in its exposure position, maintaining it in this position prior to actual tripping of the shutter to make the exposure, and in this way the reflector means 3 will not be snapped from its viewing to its exposure position under these conditions.

Figure 2:
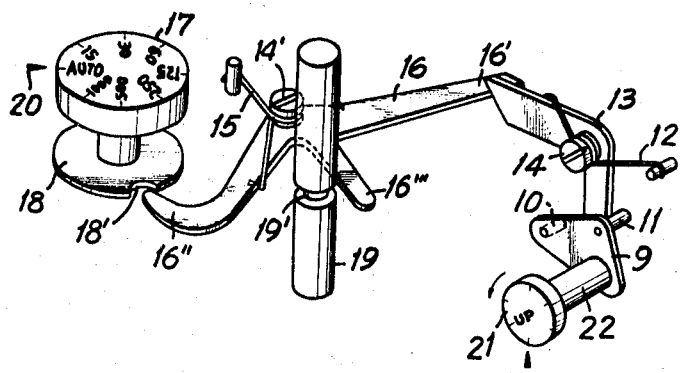
FIG. 2 is a schematic perspective illustration of part of the structure of FIG. 1 and additional camera components forming part of the present invention.

The manually operable positioning means illustrated in FIG. 1 includes a lever 8 swingable also about the pivot 2 and also coacting with the pin 4 in order to displace the reflector means 3 to its exposure position in opposition to the spring 5. The end of the lever 8 distant from the pin 4 engages a pin 10 carried by a rotary lever 9 as shown in phantom lines in FIG. 1 since it is actually located in front of the plane of FIG. 1. This lever 9 is shown in FIG. 2 fixed with a rotary shaft 22 supported by any suitable bearing in a camera wall for rotation in response to turning of a knob 21 accessible at the exterior of the camera. Thus, the lever 9 turns about the axis of the shaft 22 with the shaft 22 which turns with the knob 21. As is apparent from the lower portion of FIG. 2, the knob 21 coacts with an index and has graduations, one of which is designated by the symbol "up." When this latter graduation is aligned with the index, the pin 10 will be turned downwardly from the position of FIG. 1, swinging the lever 8 in a clockwise direction as viewed in FIG. 1, so that the reflector means 3 is maintained in its exposure position when the graduation "up" of the knob 21 is aligned with the index shown at the lower right part of FIG. 2.

The lever 9 of the manually operable positioning means also fixedly carries a pin 11. This pin 11 acts on a control lever 13 of the manually operable positioning means. The lever 13 is in the form of a bellcrank swingable upon a pivot 24 and having a pair of arms one of which is maintained in engagement with the pin 11 by the spring 12.

The control lever 13 of the manually operable positioning means has its other arm normally engaging an arm 16' of a blocking lever 16 which forms a blocking means of the invention. This blocking lever 16 is supported for swinging movement in a plane normal to that in which the control lever 13 swings. Thus, the blocking lever 16 is supported for turning movement about a pin 14' which extends perpendicularly to the pin 14. A spring 15 urges the blocking means 16 to turn in a clockwise direction, as viewed in FIG. 2. In addition to its arm 16', the blocking lever 16 has a second arm 16" and it has also a blocking finger 16''' which terminates in an outer blocking portion.

The arm 16" coacts with a cam 18 which forms part of a manually operable selecting means 17. This selecting means 17 in the illustrated example is in the form of a rotary knob capable of being turned so as to align with the index 20 a selected one of a plurality of exposure-determining factors. These factors in the illustrated example are a series of exposure times. Thus, a given exposure time graduation can be selected for alignment with the index 20 by manipulation of the selecting means 17. It will be noted that the selecting means 17 also has a position providing for selection of automatic exposure determination, and in the position shown in FIG. 2 the graduation indicating automatic exposure determination is aligned with the index 20. Thus, the manually operable selecting means 17 in the illustrated example forms a means for selecting a given exposure time or for selecting automatic exposure determination. The cam 18 of the selecting means 17 normally has its outer periphery engaging the end of the arm 16' to maintain the blocking means 16 in opposition to the spring 15 in a position where the blocking finger 16''' will not assume a blocking position. However, the cam 18 has a notch 18' which receives the end of the arm 16" when the selecting means 17 is in the automatic exposure determining position, so that in this particular position it is possible for the spring 15 to swing the lever 16 to its blocking position, provided that the manually operable positioning means has also been manipulated to position the reflector means 3 in its exposure position, as will be apparent from the description below.

A manually operable shutter release means 19 is accessible to the operator for tripping the shutter to make an exposure. This release means 19 is in the form of a simple elongated plunger, button, or the like, which can be depressed by the operator so as to be longitudinally displaced to trip the shutter-actuating structure in a manner well known in the art. A recess 19' is formed in the shutter-release means 19, and when the latter is in its rest position shown in FIG. 2, the recess 19' is at the elevation of the plane in which the blocking means 16 moves. In the illustrated example the blocking recess 19' is in the form of an annular groove formed in the shutter-release means 19.

During normal photography operations, with the reflector means 3 in its viewing position shown in FIG. 1, the operator can simply depress the shutter release means 19 so that, assuming that the shutter has previously been cocked, the tripping of the shutter to make an exposure will be carried out in a well known manner. This shutter-operating structure will operate the lever 1 in the manner described above to swing the reflector 3 to its exposure position beyond the path of light travelling through the objective. The turning of the lever 6 in response to clockwise turning of the lever 1, as viewed in FIG. 1, will release the leading curtain so as to open the shutter and start the exposure, the trailing curtain following after a given exposure time has elapsed, to terminate the exposure, as pointed out above. At the same time, as is well known, with the closing of the shutter the lever 1 and the reflector means 3 will return to their normal positions shown in FIG. 1. This sequence of operations is very well known in the art.

Of course, under the above conditions referred to as normal photography operations, the knob 21 has not been manipulated to position the mirror 3 in its exposure position prior to actuation of the shutter release means 19. Therefore, at this time, the spring 12 maintains the lever 13 on the one hand in engagement with the pin 11 and on the other hand in engagement with the arm 16' of the blocking means 16, so that the blocking finger or portion 16''' cannot enter into the recess 19', and thus the shutter release means 19 is free to be operated. Therefore, at this time, the control lever 13 of the manually operable positioning means maintains the blocking means 16 in its nonblocking position. Therefore, even if the selecting means 17 has been turned at this time to the position selecting automatic exposure determination, the arm 16'' still could not enter into the notch 18', and the parts will in fact be in the position shown in FIG. 2 where it will be noted that although the arm 16'' is aligned with the notch 18' it has not entered into the notch 18'. Thus, at this time the control lever 13 engages the arm 16' to prevent the spring 15 from swinging the blocking means 16 to its blocking position where the arm 16'' will enter into the notch 18'. As is apparent from FIG. 2, the control lever or bellcrank 13 of the manually operable positioning means has an inclined end edge engaging an edge of the arm 16' to prevent the spring 15 from swinging the lever 16 beyond the position shown in FIG. 2. In the nonblocking position shown in FIG. 2, the blocking finger 16''' is displaced beyond the shutter-release means 19 and cannot interfere with the operation thereof. Therefore, the shutter-release means 19 can be manipulated to bring about release of the shutter either with the automatic exposure determination when the selecting means 17 is in the position of FIG. 2 or with a preselected exposure time according to the setting of the selecting means 17 in the example shown in FIG. 2.

If, on the other hand, the camera is used for special photography purposes, then before tripping the shutter by manipulating the shutter-release means 19, the operator will turn the knob 21 so as to align the graduation "up" with the index shown just below the knob 21 in FIG. 2. The result is that on the one hand the pin 10 will coact with the lever 8 to place the reflector means 3 in its exposure position. At the same time the pin 11 will coact with the control lever 13 to displace the inclined free end edge thereof away from the lever 16. Thus, the pin 11 will turn the bellcrank 13 in opposition to the spring 12 in a clockwise direction, as viewed in FIG. 1. Therefore, simultaneously with the manually positioning of the reflector means 3 in its exposure position the control lever 13 of the manually operable positioning means is displaced from its position maintaining the blocking means 16 in its nonblocking position.

If, at this time the selecting means 17 is in the position of FIG. 2 where automatic exposure determination has been selected, then the arm 16'' can enter into the notch 18' of the cam 18, with the result that the blocking portion or finger 16''' can enter into the blocking recess 19', and now the blocking finger or blocking portion of the blocking means 16 is situated in the path of movement of part of the shutter release means 19 so that the latter cannot be manipulated to make exposure. As was indicated above, when the reflector means 3 is in its exposure position, the travel of light to the light-measuring structure of the automatic-exposure determining assembly is interrupted. Therefore, if the manually operable positioning means has been actuated to locate the reflector means 3 in its exposure position, it is not possible for a proper automatic exposure to be made even though the selecting means 17 has been set in the position for automatic exposure determination. In this way the structure of the invention will operate at this time to block the shutter-release means 19 against operation. However, if instead the operator has selected a given exposure time rather than automatic exposure determination, the recess 18' will be displaced beyond the arm 16'', and now the outer edge of the cam 18 will coact with the blocking means 16 to maintain it in opposition to the spring 15 in the nonblocking position where the finger 16''' is situated beyond the blocking recess 19'', so that at this time the operator can manipulate the shutter-release means 19 to make an exposure without automatic exposure determination.

It is apparent, therefore, that with the structure of the invention two conditions are required to prevent the exposure from being made. One of these conditions is that the operator has manually positioned the reflector means 3 in its exposure position in connection with special photography where it is not desired to vibrate the camera by snapping of the reflector means 3 into its exposure position as is the case with normal photography. The other condition is that a selection for automatic exposure determination has been made. It is only when both of these conditions are present that the blocking means 16 will operate to prevent manipulation of the shutter-release means 19. If, on the other hand, one of these conditions is not present, then the fact that the other condition is present still will not result in blocking of the shutter release means 19. Therefore, with the structure of the invention any improper automatic exposure control is reliably prevented in the case where the operator has manually situated the reflector in its exposure position and has carelessly permitted the camera to be set for automatic exposure determination.

As is apparent from the above description, the components of the invention are exceedingly simple and rugged. They are relatively small in number, and no difficulty is encountered in incorporating them into a single lens reflex camera to bring about the above results.

What is claimed is:

1. In a single-lens reflex camera of the type which provides automatic exposure determination with light received through the objective, reflector means having a viewing position situated in the path of light received through the objective and permitting proper automatic exposure determination and an exposure position situated beyond said path and preventing proper automatic exposure determination, manually operable positioning means coacting with said reflector means for maintaining the latter in said exposure position for special photography purposes, manually operable selecting means for selecting automatic exposure determination or one of a plurality of exposure-determining factors, manually operable shutter-release means for releasing a shutter of the camera to expose film therein, and blocking means coacting with said positioning means, selecting means, and shutter-release means for responding automatically to positioning of said reflector means in said exposure position thereof by said positioning means and selection of automatic exposure determination by said selecting means to block operation of said shutter-release means, so that an exposure cannot be made with automatic exposure determination while said reflector means is maintained in said exposure position thereof.

2. The combination of claim 1 and wherein said blocking means includes a blocking lever having a blocking position where a blocking portion of said lever is situated in the path of movement of part of said shutter-release means to prevent the latter from being actuated, said blocking means also including a spring acting on said blocking lever to urge the latter to said blocking position thereof, said manually operable positioning means coacting with said blocking lever for maintaining the latter in opposition to said spring in a nonblocking position where said blocking portion is out of the path of movement of said part of said shutter-release means, except when said manually operable positioning means has positioned said reflector means in said exposure position thereof.

3. The combination of claim 2 and wherein said positioning means includes a control lever normally maintaining said blocking lever in said nonblocking position thereof, and said positioning means displacing said control lever away from said blocking lever to release the latter to said spring when said positioning means positions said reflector means in said exposure position thereof.

4. The combination of claim 1 and wherein said blocking means includes a blocking lever having a blocking position where a blocking portion of said blocking lever is situated in the path of movement of part of said shutter release means to prevent the latter from being actuated, said blocking means also including a spring urging said blocking lever to said blocking position, said manually operable selecting means including a cam engaging said blocking lever to maintain the latter in opposition to said spring in a nonblocking position where said blocking portion is displaced from said part of said shutter-release means, except when said selecting means is in a position-selecting automatic exposure determination.

5. The combination of claim 1 and wherein said shutter-release means includes a shutter-release member formed with a recess, said blocking means including a blocking lever having a blocking portion received in said recess to prevent operation of said shutter-release means, and a spring urging said blocking portion of said blocking lever into said recess, said manually operable positioning means and manually operable selecting means both maintaining said blocking lever in opposition to said spring in a nonblocking position where said blocking portion is situated beyond said recess, so that said blocking portion will be received in said recess only when said positioning means positions said reflector means in said exposure position and said selecting means is in a position-selecting automatic exposure determination.

6. The combination of claim 1 and wherein said shutter-release means includes an elongated member longitudinally moved from a given rest position in order to actuate the shutter release, said elongated member being formed between its ends with a blocking recess, said blocking means including a blocking lever swingable in a plane which contains said recess when said shutter-release means is in said rest position thereof, and said blocking lever having a blocking finger which enters into said recess to prevent actuation of said shutter-release means, a spring acting on said blocking lever to urge said finger thereof into said recess, said blocking lever having a pair of arms in addition to said finger thereof, said positioning means including a control lever normally engaging one of said arms of said blocking lever to prevent said finger from entering into said recess, said positioning means displacing said control lever away from said one arm to release said blocking lever for movement to a blocking position where said finger is in said recess when said manually operable positioning means positions said reflector means in said exposure position, and said manually operable selecting means including a cam engaging the other of said arms of said blocking lever for preventing said spring from displacing said finger into said recess except when said selecting means is in a position selecting automatic exposure determination.

7. The combination of claim 6 and wherein said cam has a notch and said other arm has an end received in said notch only when said selecting means is in said position for providing automatic exposure determination.

8. The combination of claim 6 and wherein said control lever is turnable in a plane normal to that in which said blocking lever moves.

9. The combination of claim 8 and wherein said control lever is in the form of a bellcrank having one arm normally engaging said one arm of said blocking lever, said positioning means having a rotary member provided with a pin engaging the other arm of said control lever, and a second spring maintaining said other arm of said bellcrank in engagement with said pin, said positioning means when positioning said reflector means in said exposure position displacing said bellcrank to a position releasing said blocking lever for movement to said blocking position thereof.

10. The combination of claim 1 and wherein said positioning means includes a positioning lever turnable about a given axis and coacting with said reflector means for displacing the latter to said exposure position when said positioning means is actuated, and a second reflector-actuating lever also turnable about said given axis and coacting with said reflector means during normal photography operations for displacing said reflector means to said exposure position just prior to making an exposure.

* * * * *